T. W. CHRISTIAN.
COUPLING.
APPLICATION FILED MAY 11, 1908.
911,645.
Patented Feb. 9, 1909.
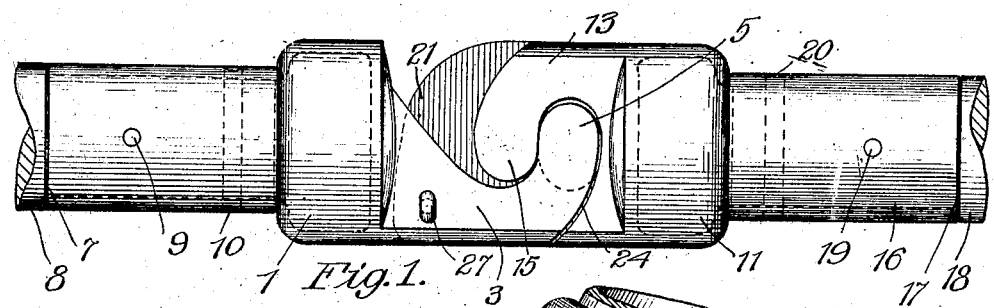
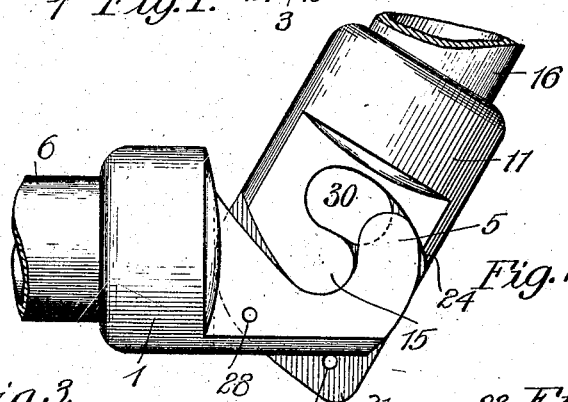
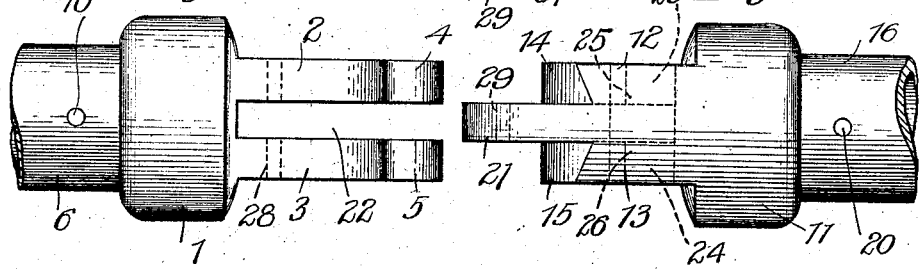
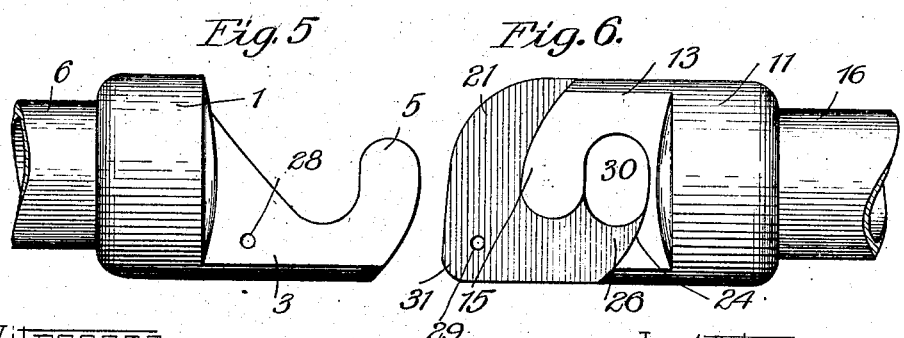
Witnesses:
Albert G. McCaleb.
Frank J. Thelen.
Inventor
Thomas W. Christian.
By Brown & Williams
Attorneys.

UNITED STATES PATENT OFFICE.

THOMAS W. CHRISTIAN, OF CHICAGO, ILLINOIS.

COUPLING.

No. 911,645.  Specification of Letters Patent.  Patented Feb. 9, 1909.

Application filed May 11, 1908. Serial No. 432,108.

*To all whom it may concern:*

Be it known that I, THOMAS W. CHRISTIAN, a citizen of the United States, residing at Chicago, in the county of Cook and State of Illinois, have invented a certain new and useful Improvement in Couplings, of which the following is a full, clear, concise, and exact description, reference being had to the accompanying drawings, forming a part of this specification.

My invention relates to couplings, particularly to such as are used for coupling together rods or pipes used in conduit work, and the object of my invention is to produce a coupling of simple design, which at the same time is very efficient.

As conduit pipe is rodded from manholes which are usually of comparatively small diameter, it is very important that the coupling be of such design that its members can readily be brought together for coupling engagement with the rods almost at a right angle to each other so that it will not be necessary to use short rods with the consequent multiplication of couplings.

The coupling in my invention is so designed that the parts can be brought together with the rods practically at right angles to each other, and immediately when the coupling members are brought together they are ready to transmit movement of the one rod to the rod already within the conduit pipe. Provision is made so that the couplings will resist torsional strains.

In the accompanying drawings which illustrate my invention—Figure 1 is an elevation view showing the two members locked together, part of the conduit rods being shown. Fig. 2 is an elevation view showing the coupling heads after having just been brought together. Fig. 3 is a top view of one coupling member. Fig. 4 is a top view of the companion coupling member. Fig. 5 is an elevation view of the coupling member shown in Fig. 3, and Fig. 6 is an elevation view of the coupling member shown in Fig. 4.

One of the coupling members comprises the head 1, from the inner face of which extend two similar parallel hook frames 2 and 3, terminating in the hook ends 4 and 5, the hook ends being substantially parallel with the head member. From the opposite face of the head member extends a neck part 6, this neck part and head being cored out to secure likeness. The neck part 6 forms a sleeve for the reduced end 7 of a conduit rod 8, pins 9 and 10 passing through the sleeve and rod, serving to secure the rod to the coupling member. To give greater strength, these pins are at right angles to each other as shown. The other coupling member comprises the head part 11, from whose inner face extend the hook members 12 and 13 terminating in hook ends 14 and 15, these hook ends being substantially parallel to the head part. A neck 16 extends from the other face of the head part, said neck and head being cored out. The cored neck forms a sleeving for receiving the reduced end 17 of a conduit rod 18, pins 19 and 20 at right angles to each other serving to hold the rod in place.

Extending between the hook members and from the inner face of the head 11 is the web or wall 21 for engaging in the guideway 22 between hook frames 2 and 3 of the other coupling member. When the members are brought together, usually at an angle with each other, the web 21 is inserted in the slot 22, the hook ends of the applied coupling member being thereby guided into engagement with the hook ends of the other member, and upon such engagement the members can be rotated to position to bring the connected rods in line. The web 21 acts both as a guiding means and for taking up the torsional strains. The bases of the hook members 12 and 13 are carried down along the web 21 to form walls 23 and 24, which with the hook ends 14 and 15 form pockets 25 and 26 for receiving the hook ends 4 and 5 of the other coupling member. When the members are coupled together, as shown in Fig. 1, the front edge of the web 21 rests against the inner face of the head 1.

The bases of hook frames 2 and 3 are a continuation of the outer surface of head 1 and the upper edges of the hook frames slope upwardly from the base of the hook ends toward the top of head 1, giving thus great strength to these hook frames. The top outer edge of the web 21 is rounded as shown to clear the head 1 when the members are brought together. All tension strains are taken up by the hook frames of the members. When the members are coupled together, the front edge of web 21 is against the head 1, and the outer faces of the hook ends 4 and 5 are against the walls 23 and 24 and all push or compression strains are taken up by these members. The web member and the hook frames 2 and 3, between which it engages, resist all torsional strains and also resist lateral bending. There is only one way in which the members can become disconnected, and that is in the direction of uncoupling, which is the reverse of the direction of rotation of the members when they are coupled together. This self-uncoupling rotation, however, is prevented by the conduit pipes which prevent sufficient relative rotation of coupling members to allow uncoupling thereof. Such uncoupling movement can, however, be positively prevented by means of a pin 27 passing through openings 28 in the hook frames 2 and 3 and through opening 29 in web 21. This pin may be an ordinary spring pin which can readily be slipped into place after the members have become coupled. This pin connection, however, would be of more use in well drilling; for example, where the rods are rotated and must be kept in perfect alinement. The pin would also be necessary where the couplings are used for connecting together flexible members, such as sections of rope, chain or the like.

Couplings of this class are usually subjected to dirt which will readily fill in corners and tend to prevent perfect coupling. To prevent accumulation of dirt between the hook ends and the engaging walls, I cut away the web 21 between the hook ends 14 and 15 and the opposite section of walls 23 and 24, leaving thus an opening 30 in which dirt will not readily stick, and which allows any dirt which may have accumulated therein to be quickly removed. The point 31 of the web 21 is also rounded to prevent compression of dirt between this end and the face of head 1 when the coupling members are brought to coupling position. It will also be noticed that when the members are coupled they form a substantial cylindrical structure, the outer edges of the heads being rounded and therefore very little resistance is offered by the coupling to passage through conduit pipe. The heads being also of larger diameter than the neck portions the rods, usually of wood, will not touch the conduit walls and will therefore be protected against abrasion and wear. The coupling members are in the form of integral castings of any suitable metal.

I therefore produce a coupling which is of simple, inexpensive design but at the same time very efficient for withstanding all the strains to which couplings of this class are apt to be subjected. The members when once coupled together can be readily locked against any self-disconnection which enables the coupling to be used for connecting together any members, whether rigid or flexible. Dirt can not accumulate and clog the parts so that complete and proper coupling is always assured.

I desire to secure by Letters Patent the following claims:

1. In a coupling comprising two members, the combination of the head part 1 of one member, parallel extensions 2 and 3 from said head part forming groove 22 and terminating in hook ends 4 and 5 respectively, the head part 11 of the companion member, extensions 12 and 13 from said head 11 terminating in hook ends 14 and 15 for engagement with hook ends 4 and 5 of the other member, web 21 extending from the head 11 between and beyond the hook ends 14, 15, said web entering the groove 22 between the extensions 2 and 3 of the first member for guiding the hook ends into engagement with each other.

2. In a coupling comprising two members, the combination of the head part 1 of one member, parallel extensions 2 and 3 from said head part forming groove 22 and terminating in hook ends 4 and 5 respectively, the head part 11 of the companion member, extensions 12 and 13 from said head 11 terminating in hook ends 14 and 15 for engagement with hook ends 4 and 5 of the other member, web 21 extending from the head 11 between and beyond the hook ends 14, 15, said web entering the groove 22 between the extensions 2 and 3 of the first member for guiding the hook ends into engagement with each other, there being openings 28 through the extensions 2, 3, and the opening 29 through the web 21, and a locking pin 27 engaging in said openings for positively locking the said members together.

3. In a coupling comprising two members, the combination of a head part of one of the members, parallel extensions from said head part terminating in hook ends at right angles to the extensions, a head part for the companion member, parallel extensions from said head part terminating in hook ends at right angles to the said extensions, a web extending from said head part of the second member between and beyond the hook extensions of said member, said web entering between the hook ends and extensions of the first member to guide the hook ends into engagement with each other, the web being cut away in the bend of the hook extension from the second member to leave an opening for preventing the accumulation of dirt.

In witness whereof, I have hereunto set my hand this 6th day of May, A. D. 1908.

THOMAS W. CHRISTIAN.

Witnesses:
CHARLES J. SCHMIDT,
GEORGE E. HIGHAM.